Dec. 17, 1968  A. BANKS  3,416,968

PRIMARY CELL

Filed Oct. 24, 1965

INVENTOR.
ABRAHAM BANKS

BY

ATTORNEY

United States Patent Office 3,416,968
Patented Dec. 17, 1968

3,416,968
PRIMARY CELL
Abraham Banks, 18710 Paseo Nuevo Drive,
Tarzana, Calif. 91356
Filed Oct. 24, 1965, Ser. No. 504,882
11 Claims. (Cl. 136—102)

ABSTRACT OF THE DISCLOSURE

The invention relates to improved primary dry cells and is particularly characterized in that the electrolyte mixture thereof contains a substantial amount of ammonium bifluoride as a constituent thereof. In amounts above twenty-five percent, by volume, the novel dry cell provides substantial improvement in the form of higher open circuit voltage and short circuit current and increased ampere-hour capacity and length of operating life.

---

This invention relates to primary cells, and pertains more especially to an improved primary dry cell. As understood in the art, the phrase "dry cell" means one having its electrolyte in the form of an immobilized aqueous solution, and a "primary cell" means one wherein an electro-chemical reaction occurs between electrodes of an oxidizing metal anode and a cathode of reducible material and in which the electrolyte is made up of the halides of ammonium and of certain metals such as zinc and aluminum.

In comparison with conventional primary cells, as for example, of the Leclanche type, those in accordance with the present invention are characterized by a substantially higher open circuit voltage and short circuit current rating; by dramatically increased ampere-hour capacity and length of operating life; and by ready adaptability to well known manufacturing methods and materials. As described below in greater detail, these improved results are achieved through the use of ammonium bifluoride as an ingredient, at least, of the electrolyte of primary cells.

The original Leclanche cell, invented by G. Leclanche in 1868, with minor improvements in materials and manufacturing techniques, has been the bulwark of the commercial market for primary battery cells for more than half a century. The Leclanche cell utilizes a zinc electrode and manganese dioxide as the reducible oxide in the depolarizer mix. Notwithstanding the development of primary cells utilizing new materials and methods of manufacture, the conventional Leclanche cell still captures about ninety percent of the market. The Leclanche cell is commonly referred to as a carbon-zinc type cell.

Although improved primary cells having superior open circuit voltage and performance characteristics have been developed, it is noteworthy that the art has been unable to provide, for almost a century, an effective competitor for conventional primary dry cells of the Leclanche type. This failure is attributable largely to the high cost of the materials required for cells of more recent design. For example, a primary cell utilizing magnesium as the cathode, and magnesium bromide as the electrolyte has become well known in the art. Although this cell provides the advantage of a significantly longer life than the conventional Leclanche cell, and has an open circuit voltage about equal to that of the improved primary cell of the present invention, the high cost of magnesium, high internal impedance, and other disadvantageous features have combined to prevent its adoption for extensive commercial use.

Accordingly, it is among the principal objectives of the present invention to provide:

(1) An improved, economical primary dry cell having conventional electrode materials, but characterized by increased ampere-hour capacity and open circuit voltage and by greatly increased operating life over that which can be obtained with the best of the presently known conventional primary cell constructions; and (2) An improved primary dry cell which utilizes conventional materials and manufacturing techniques as in conventional primary cells, except for modification of the electrolyte through the addition or substitution of ammonium bifluoride ($NH_4HF_2$, sometimes called ammonium hydrogen fluoride), and having open circuit voltages up to 1.96 volts, which is about twenty-one percent higher than the open circuit voltages provided by conventional Leclanche type primary cells having zinc-manganese dioxide electrodes.

In accordance with a preferred embodiment, the improved primary cell of the present invention includes a plastic housing having generally rectangular openings in its top and bottom walls. A zinc anode in the form of a flat plate, and having one surface in contact with a conductive carbon sheet which may be in the form of a coating, is accommodated within the housing so that the said carbon sheet is exposed through one of the openings. An insulating separator which may be made of ionic permeable but electrically insulating material, as, for example, paper, is disposed over the inner surface of the zinc anode, and the remainder of the housing is filled with a depolarizing electrolytic cake made up of a cathode material such as powdered manganese dioxide; a conducting and moisture retaining agent such as powdered carbon; and a novel electrolyte comprised of one half, by volume, of a standard prior art electrolyte (such as ammonium chloride, zinc chloride, or a mixture thereof) and one half, by volume, of ammonium bifluoride. As further described below, the volume percentage of ammonium bifluoride may be varied in order to obtain optimal performance characteristics for the intended application. The electrolytic cake also contains sufficient liquid so that, with the powdered ingredients previously mentioned, a gelatinous or semi-solid composition is formed.

The text above is intended to summarize and explain the significance of the present invention in relation to the prior art. For a more complete understanding of the implementation and novel features of the improved dry cell of the present invention, reference is made to the descriptive text below and to the appended drawings, wherein like numerals are attached to similar parts in the various figures, and wherein.

A battery is comprised of a plurality of unitary electrochemical cells. Where an output voltage higher than that of a single cell is required, the respective output voltages of a plurality of cells may be summed merely by coupling them in series. Likewise, output currents higher than those available from a single cell may be obtained by coupling a plurality of cells in parallel relationship.

Figure 1:
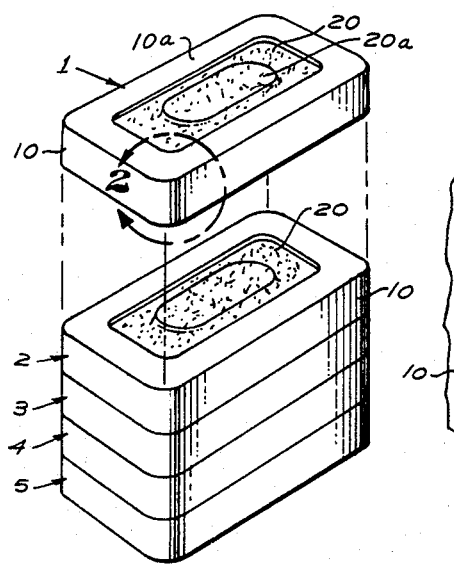
FIGURE 1 is a perspective view representing the manner in which only five flat cells in accordance with the present invention may be stacked to provide a 9-volt rated battery.

The significance of the improved dry cell of the present invention to the battery art is illustrated in FIGURE 1, which shows only five unitary dry cells, 1 to 5, inclusive, of flat configuration, each having an open circuit output voltage of 1.96 volts, coupled in series, by stacking, to provide a rated 9-volt battery. Heretofore, a 9- volt battery fabricated from conventional prior art types of primary dry cells of 1.55 volt open circuit rating has required six units coupled in series. Therefore, it is evident that the improved primary dry cells of this invention makes possible an important economy in space, weight, materials, and assembly of primary dry batteries.

Figure 2:
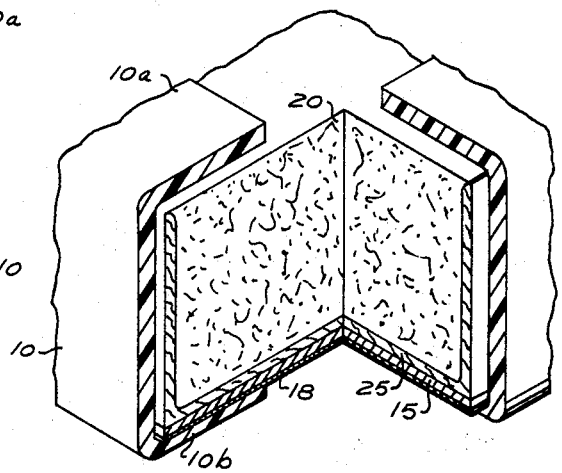
FIGURE 2 is a cutaway view of the section 2 of FIGURE 1, showing in perspective the essential internal structure of a flat dry cell in accordance with the present invention.

As depicted in the illustrative examples of FIGURE 2, the structure of an improved primary dry cell according to the present invention is essentially the same as that of conventional primary cells as discussed hereinbefore. It is comprised generally of a flat, hollow plastic case 10 of rectangular cross-section, a zinc plate 15 having its exterior surface coated with a layer of conductive carbon 18, a depolarizing cathode-electrolyte cake 20 containing as one of its ingredients the manganese dioxide cathode in powdered or comminuted form, and an insulating separator 25 disposed between the inner surface of zinc anode 15 and the cathode-electrolyte cake 20. As previously mentioned the electrolyte cake 20 contains sufficient moisture so that the material mixture is in a gelatinous or semi-solid state. Thus, it should be apparent that the present invention is practiced through use of the basic structure of conventional primary dry cells.

The plastic case 10 is provided with rectangular openings in its top wall 10a and its bottom wall 10b to enable the cells 1 to 5 inclusive to be coupled together securely to form a dry battery.

The zinc anode plate 15 is essentially a flat, rectangular element effectively disposed over the interior surface of the bottom wall 10b of the plastic case, so that the opening therein is closed. The insulating separator 25 effectively insulates and separates the anode 15 from the cathode-electrolyte cake 20, but permits the movement of ions in solution between the electrodes. It is characterized by its porosity and chemical inertness.

The shape of the cathode-electrolyte cake 20 is like that found in the prior art. It fills the interior of plastic case 10, and is provided with a centrally disposed, integral embossment 20a having its surface in virtual coplanar relation with the exterior surface of the top wall 10a of the plastic case.

The composition of the cathode-electrolyte cake 20 comprises powdered or comminuted manganese dioxide as a cathode material, carbon in the form of acetylene black to absorb moisture and enhance electrical conduction, and a novel electrolyte made up of equal parts, by volume of a standard prior art electrolyte (such as ammonium chloride or zinc chloride, or a mixture thereof) and of ammonium bifluoride, often called ammonium hydrogen fluoride.

Although the embodiment described above utilizes an electrolyte made up of equal volumes of ammonium bifluoride and of a standard prior art electrolyte as described above, it should be understood that the 1.96 volt rated open circuit voltage of cells in accordance with the present invention may be obtained when ammonium bifluoride is used as the only ingredient of the electrolyte, or, alternatively, when it comprises as little as fifty percent, by volume, of an electrolyte having either ammonium chloride or zinc chloride, or a mixture of the two, as the remaining portion. Moreover, a significant increase in the 1.55 volt open circuit rating of conventional zinc-manganese dioxide, Leclanche-type cells, or the like, results when ammonium bifluoride comprises only twenty-five percent, by volume, of the electrolyte and the remainder is ammonium chloride, zinc chloride, or a mixture of the two. For example, tests have disclosed that the open circuit voltage of a cell utilizing ammonium bifluoride as twenty-five percent, by volume, of the electrolyte is about 1.625 volts. Further increase in the volume percentage of ammonium bifluoride from twenty-five percent results in a corresponding increase in open circuit voltage. This increase appears to maximize, however, at fifty percent ammonium bifluoride, for a further increase in the proportion of this ingredient has no apparent effect on the magnitude of the open circuit voltage, which remains at about 1.96 volts.

Figure 3:
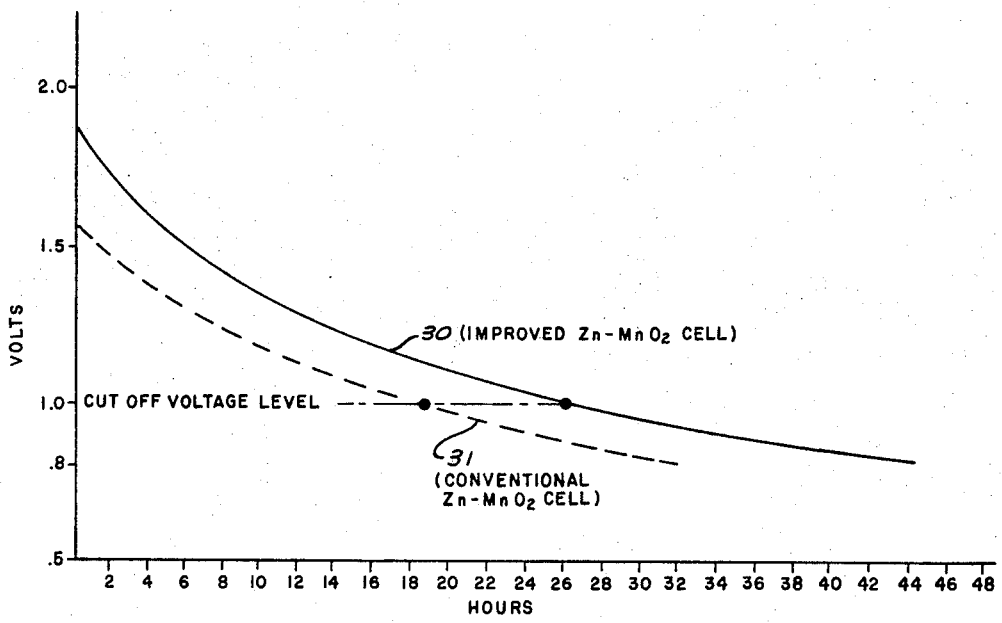
FIGURE 3 represents graphically the life of the improved dry cell of the present invention in relation to that of a conventional commercial carbon-zinc type Leclanche dry cell.

A comparison of the service life of an improved primary dry cell in accordance with the present invention with that of a conventional 1.55-volt Leclanche cell having zinc-manganese dioxide electrodes is represented graphically in FIGURE 3. For clarity the curves are idealized in that minor variations of curvature attributable to impurities and other physical or testing anomalies of unknown character have been omitted. The data used for constructing the curves was taken by connecting loads across the terminals of the test cells so that the initial current from each was ten milliamperes.

From the curves of FIGURE 3 it is evident that, with reference to an arbitrary cut-off voltage of 1.0 volt, the service life of the improved cell of the present invention, curve 30, is significantly longer than that of the conventional cell depicted by the curve 31. As shown by the curves, the life of the improved cell is over twenty-seven hours while that of the conventional cell is less than nineteen hours.

Although this invention has been described with reference to so-called flat, primary dry cells, it should be understood that it may be embodied to equal advantage in cells of other configurations. For example, the anode may be comprised of a zinc envelope in the form of a cylinder or other shape, a current-gathering carbon electrode may be centrally disposed within the envelope, and the unique cathode-electrolye mixture described hereinabove may fill the space between the anodic envelope and the carbon electrode. It should further be understood and be obvious those skilled in the art that the foregoing description is by way of example only and that the advantages of utilizing ammonium bifluoride as an electrolyte ingredient may be realized with anode-cathode arrangements other than the commercially favored zinc-manganese dioxide combination most specifically discussed herein.

Accordingly, it is anticipated that the novel concepts represented directly or inferentially in the specification and drawings of the present disclosure may enable the design of other modifications and embodiments within the scope of the present invention. It should therefore be understood that the invention is not to be limited by the specific illustrative examples, but rather by the scope of the appended claims.

What is claimed is:

1. A primary cell having an electrode of manganese dioxide and an electrode of zinc, and an electrolyte containing at least twenty-five percent, by volume, of ammonium bifluoride.

2. A primary cell comprising an anode of zinc, a cathode of manganese dioxide, and an electrolyte containing, by volume, at least twenty-five percent ammonium bifluoride.

3. The primary cell of claim 2 wherein said electrolyte comprises ammonium chloride and ammonium bifluoride and in which the ammonium bifluoride comprises at least twenty-five percent of the total volume of the mixture.

4. The primary cell of claim 2 wherein said electrolyte comprises a mixture of ammonium chloride, zinc chloride and ammonium bifluoride and ammonium bifluoride comprises at least twenty-five percent of the total volume of any mixture of the said compounds.

5. A primary dry cell comprising an anode and a depolarizing cathode-electrolyte mix, said mix comprising a conducting and moisture absorbing ingredient, and an electrolyte, said electrolyte containing, by volume, at least twenty-five percent ammonium bifluoride.

6. A primary dry cell as represented in claim 5 wherein said electrolyte comprises a mixture of ammonium chloride and ammonium bifluoride, and wherein said ammonium bifluoride comprises at least twenty-five percent, by volume, of the entire volume of said mixture.

7. A primary dry cell as represented in claim 5 wherein said electrolyte comprises a mixture of ammonium chloride, zinc chloride and ammonium bifluoride, and wherein said ammonium bifluoride comprises at least twenty-five percent, by volume, of the entire volume of said mixture.

8. An improved primary cell comprising:
an anode of zinc having a conductive coating of carbon on one surface;
a sheet of porous and chemically inert material disposed over the other surface of the zinc anode;
and a depolarizing cathode-electrolyte mix disposed in contiguous relation to the sheet of material, said mix comprising manganese dioxide as a cathode material, a conducting and moisture retaining material, and an electrolyte containing at least twenty-five percent of ammonium bifluoride, by volume.

9. An improved primary cell of the Leclanche type as represented in claim 8 wherein the electrolyte comprises at least one of ammonium chloride and zinc chloride mixed with said ammonium bifluoride.

10. A battery electrolyte composition consisting of a mixture of at least one of ammonium chloride and zinc chloride; and said mixture further including ammonium bifluoride, said ammonium bifluoride comprising at least twenty-five percent, by volume, of the volume of the mixture.

11. A battery electrolyte consisting of a mixture of ammonium chloride, zinc chloride and ammonium bifluoride, said bifluoride comprising at least twenty-five percent, by volume, of the volume of the mixture.

References Cited
UNITED STATES PATENTS

| | | | |
|---|---|---|---|
| 2,407,489 | 9/1946 | Gray | 204—55 |
| 2,446,983 | 8/1948 | Prust | 204—55 |
| 2,596,466 | 5/1952 | Bowden | 148—26 |
| 2,811,484 | 10/1957 | DeLong | 204—55 |
| 3,060,256 | 10/1962 | Paulson | 136—155 |

WINSTON A. DOUGLAS, *Primary Examiner.*

C. F. LEFEVOUR, *Assistant Examiner.*

U.S. Cl. X.R.

136—83, 155; 252—62.2